No. 631,999. Patented Aug. 29, 1899.

G. A. SCHOELLER.

AMMUNITION CONVEYER OR RAMMER FOR GUNS.

(Application filed May 2, 1899.)

(No Model.) 3 Sheets—Sheet 1.

Witnesses:
G. W. Eissenbrann
C. P. Hendrickson

Inventor:
Gustav A. Schoeller,
by [illegible]
Attorney.

No. 631,999. Patented Aug. 29, 1899.

G. A. SCHOELLER.

AMMUNITION CONVEYER OR RAMMER FOR GUNS.

(Application filed May 2, 1899.)

(No Model.) 3 Sheets—Sheet 2.

Witnesses:
G. W. Eisenbraun
E. P. Hendrickson

Inventor:
Gustav A. Schoeller
by [signature]
Attorney.

No. 631,999. Patented Aug. 29, 1899.

G. A. SCHOELLER.

AMMUNITION CONVEYER OR RAMMER FOR GUNS.

(Application filed May 2, 1899.)

(No Model.) 3 Sheets—Sheet 3.

Witnesses:
G. W. Eisenbraun
E. P. Hendrickson

Inventor:
Gustav A. Schoeller
by A. Faber du Faur Jr.
Attorney.

UNITED STATES PATENT OFFICE.

GUSTAV A. SCHOELLER, OF MÜLHEIM-ON-THE-RUHR, GERMANY, ASSIGNOR TO FRIED. KRUPP, OF ESSEN, GERMANY.

AMMUNITION CONVEYER OR RAMMER FOR GUNS.

SPECIFICATION forming part of Letters Patent No. 631,999, dated August 29, 1899.

Application filed May 2, 1899. Serial No. 715,321. (No model.)

*To all whom it may concern:*

Be it known that I, GUSTAV A. SCHOELLER, a citizen of the German Empire, residing at Mülheim-on-the-Ruhr, Germany, have invented certain new and useful Improvements in Ammunition Conveyers or Rammers for Guns, of which the following is a specification.

This invention relates to an ammunition conveyer or rammer for guns, consisting of a system of telescopic rack-bars actuated by a pinion engaging the rack-bars one after the other.

Like other ammunition-feeds this apparatus may also be used for transporting other objects.

The nature of the invention will be best understood when taken in connection with the accompanying drawings, in which—

Figures 1, 2, 3, 4:
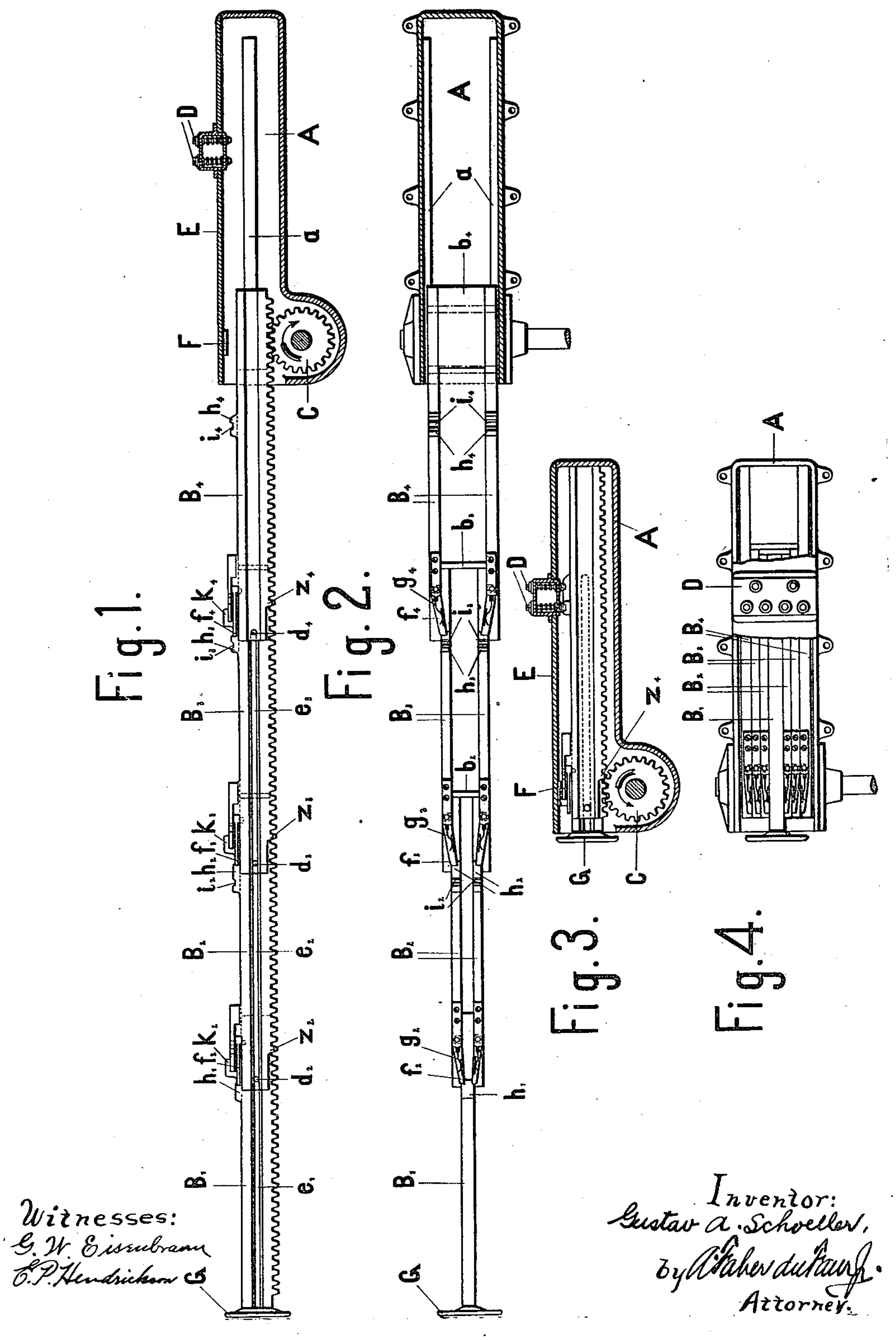

Figure 1 is a side view of the extended apparatus. Fig. 2 is a plan view of Fig. 1. Fig. 3 is a side view of the apparatus, the casing being shown in section and the system of rack-bars confined within the casing. Fig. 4 is a plan of Fig. 3, the cover being partly cut away. Figs. 5 to 9 are detail views to be referred to hereinafter, Fig. 8 being a section on the line 8 8, Fig. 7, viewed from the left side. Fig. 10 is a side elevation showing the application of the apparatus to conveying a projectile to the gun.

Similar letters of reference designate corresponding parts throughout the several views of the drawings.

The apparatus shown in Figs. 1 and 2 consists of a series of rack-bars B′ $B^2$ $B^3$ $B^4$, of which the rack-bar B′ with the head-piece G is formed as a single bar, while the remaining rack-bars $B^2$ $B^3$ $B^4$ are each composed of two parallel cheek-pieces connected at one end by a cross-tie, (marked $b^2$ $b^3$ $b^4$, respectively.)

Figure 5:
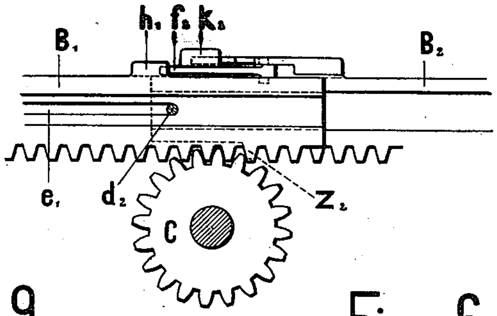
Figure 6:
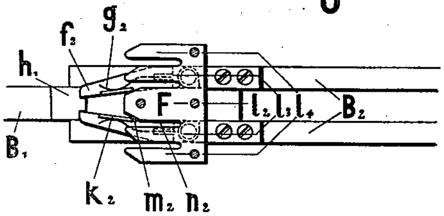
Figure 8:
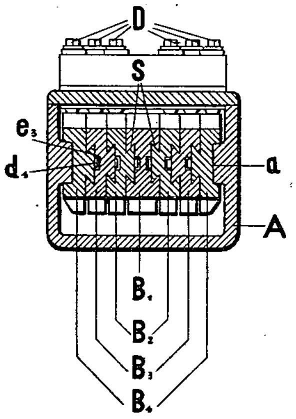
Figure 7:
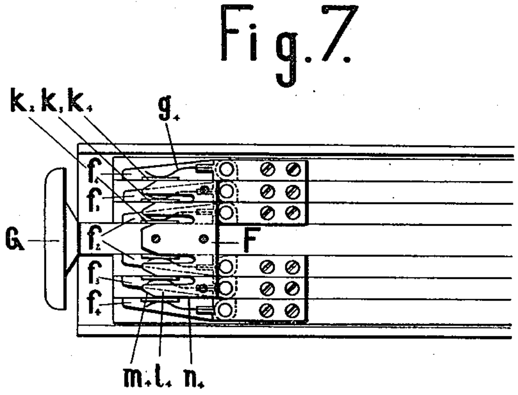

The rack-bar B′ is placed between the cheeks of the rack-bar $B^2$ and is guided on it by dovetailed tongues of the bar $B^2$ engaging corresponding grooves in the bar B′, Fig. 8. By this arrangement the rack-bar B′ is free to slide on the rack-bar $B^2$, and at the same time the shape of the tongues and grooves is such as to hold the cheeks of the bar $B^2$ together, so that no cross-tie is required at the forward end of $B^2$. The throw of the rack-bar B′ on the rack-bar $B^2$ is limited by a pin $d^2$, Figs. 1 and 5, provided on the bar $B^2$ and engaging a groove $e'$ of the bar B′. Furthermore, two pawls $f^2$, Figs. 2 and 6, are provided on the bar $B^2$, said pawls having projections $k^2$, against which springs $g^2$ bear, so as to turn the pawls in against the end of a lug $h'$ on the bar B′ when the latter is at the outer end of its stroke, as shown in Figs. 1, 5, and 6, to prevent pushing back of the bar B′. The bars B′ and $B^2$ are thus coupled together.

Of the teeth of the rack-bar $B^2$ the foremost one, $z^2$, Figs. 1 and 5, is somewhat shorter than the rest, for a purpose to be referred to hereinafter.

The arrangements described above in relation to the bars B′ and $B^2$ are repeated on the bars $B^2$ $B^3$, respectively, $B^3$ $B^4$, in addition to which stops or rests $i^2$, $i^3$, and $i^4$ are provided on the lugs $h^2$, $h^3$, and $h^4$, Figs. 1 and 2, the object of which will be explained further on.

From the above description it is seen that the rack-bars form a telescopic system which when shortened, Fig. 4, does not occupy much more space than that corresponding to the length of a single bar and which when fully extended is secured against pushing in by the pawls $f^2$ $f^3$ $f^4$ being thrown in and abutting against the lugs $h'$ $h^2$ $h^3$.

The rack-bar $B^4$ is guided on ledges $a$, Figs. 1, 2, and 8, of the casing A, the length of which is such that the system of rack-bars is entirely within it when shortened the full extent, Figs. 3 and 4. A pinion C is so placed within the casing that when the bars are all within the casing, as shown in Fig. 3, it engages only the teeth of the rack-bar B′, while, as already stated, the forward teeth $z^2$ $z^3$ $z^4$ of the rack-bars $B^2$ $B^3$ $B^4$ are outside the path of the pinion C. When, then, by turning the pinion C the rack-bar B′ is pushed out, a forward motion of the rack-bars $B^2$ $B^3$ $B^4$ is excluded and only commences after the rack-bar B′ has arrived near the end of its forward stroke, when one of these bars after the other is in the same manner brought into engagement with the pinion, as will be described below. To guard any of the bars being carried along by friction on the one which is actuated by the pinion, spring-bolts D are provided on the cover of the casing, Figs. 3 and 4, which engage the rests or stops $i^2$ $i^3$ $i^4$ of such bars as are fully within the casing and hold these bars against forward motion until a force is exerted sufficient to take the cam-shaped ends of the bolts D out of the rests. This can only happen when the rack-bars are started forward by the pins $d^2$ $d^3$ $d^4$ engaging the ends of the grooves $e'$ $e^2$ $e^3$.

Figure 9:
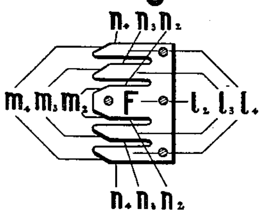
Figure 10:
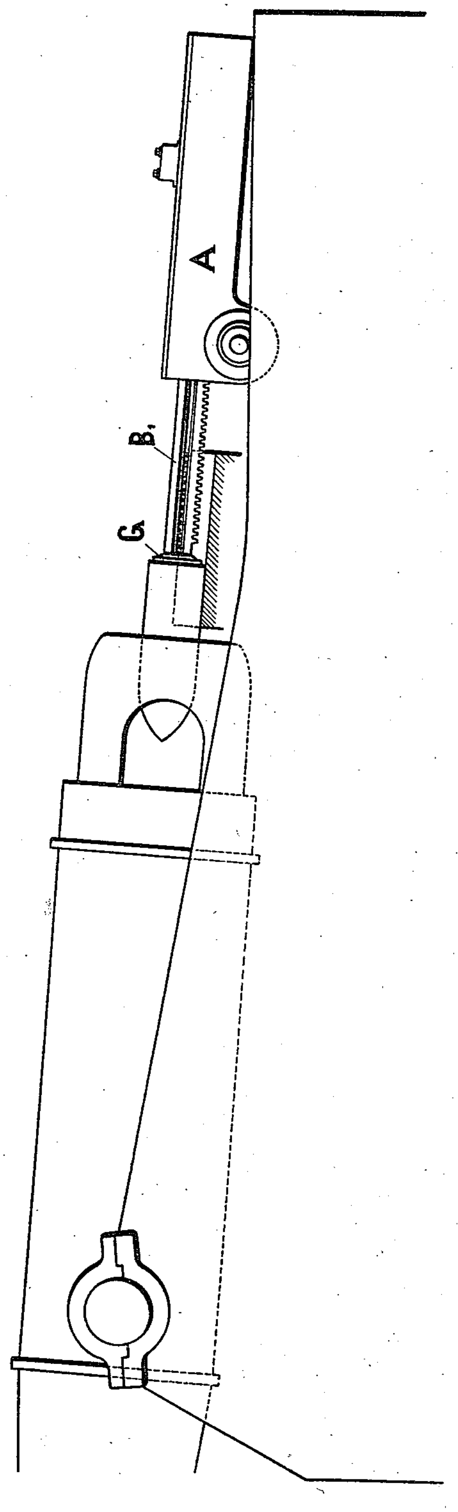

Above the pinion C the cover E of the casing A, Figs. 1, 3, 6, and 7, is also provided with a comb-shaped plate F, which is shown in detail in Fig. 9. In pushing in the system of rack-bars the teeth $l^2$ $l^3$ $l^4$ by their oblique faces $m^2$ $m^3$ $m^4$ engage the pawls $f^2$ $f^3$ $f^4$ and move them out of engagement with the lugs $h'$, $h^2$, and $h^3$. When the system is entirely pushed into the casing, the projections $k^2$ $k^3$ $k^4$ of the pawls $f^2$ $f^3$ $f^4$ lie against the faces $n^2$ $n^3$ $n^4$ of the teeth $l^2$ $l^3$ $l^4$, so that the pawls are held away from the lugs $h'$ $h^2$ $h^3$.

The operation of the apparatus is as follows: When the apparatus is not in use, the several parts have the positions shown in Figs. 3 and 4. If a projectile or a cartridge is to be carried to the gun, the pinion C is actuated by hand or by a motor in the direction of the arrow in Fig. 3. Since the teeth of the pinion C engage the rack-bar B′ only, the latter alone is first pushed out, and this only until the ends of the grooves $e'$ reach the pin $d^2$ of the rack-bar $B^2$, Fig. 5. As shown in particular by this latter figure, the rack-bar B′ now carries along the rack-bar $B^2$, and thereby brings into engagement with the pinion C the tooth $z^2$, and in succession the remaining teeth of the rack-bar $B^2$. While the pinion is already in engagement with the rack-bar $B^2$ and before the teeth of the rack-bar B′ have passed the pinion, the projections $k^2$ of the pawls $f^2$, Fig. 6, leave the teeth of the comb F and snap in behind the lugs $h'$, so that when the rack-bar B′ moves out of engagement with the pinion the rack-bar $B^2$, now coupled to the rack-bar B′, carries the latter forward with it. In exactly the same manner by continued rotation of the pinion C the rack-bars $B^3$ and $B^4$ are brought into action, so that finally the system assumes the position shown in Figs. 1 and 2. While the system is being pushed out, the spring-bolts D in the above-described manner prevent a premature forward motion of any one of the rack-bars by frictional contact with the preceding one. When the projectile or cartridge has been pushed entirely into the gun, the pinion C is rotated in the direction of the arrow, Fig. 1, whereby the whole system of rack-bars is returned into the case A. The instant the first teeth of the rack-bar $B^3$ are engaged by the pinion and while the rack-bar $B^4$ is still in engagement the projections $k^4$ of the pawls $f^4$ strike against the inclined faces $m^4$ of the teeth $l^4$ of the comb F, (see Figs. 6 and 7,) whereby the pawls $f^4$ are moved away from the path of the lugs $h^3$ of the rack-bar $B^3$, so that while the teeth of the rack-bar $B^4$ become disengaged from the pinion C and this rack-bar $B^4$ becomes stationary the remaining bars $B^3$ $B^2$ B′ continue their motion into and toward the casing A. During continued rotation of the pinion C the bar $B^2$ is uncoupled from $B^3$ and B′ from $B^2$, the rack-bars finally again assuming the positions shown in Figs. 3 and 4.

What I claim as new is—

1. An ammunition conveyer or rammer for guns, consisting of a casing; a series of rack-bars telescopically connected; a pinion actuating said bars in regular succession, and automatic couplers connecting the bars in succession during their forward movement out of the casing, and uncoupling the same, when pushed into the casing, substantially as and for the purpose specified.

2. An ammunition conveyer or rammer for guns, consisting of a casing; a series of rack-bars telescopically connected, the first or outer rack-bar consisting of a single bar, the remainder formed of two cheeks connected by cross-ties, the bars connected and guided by dovetailed tongues and grooves; the last pair of cheek-pieces guided on ledges on the side of the casing engaging corresponding grooves in the cheeks; a pinion actuating the rack-bars in succession; and automatic couplers, substantially as and for the purpose specified.

3. An ammunition conveyer or rammer for guns, consisting of a casing; a series of rack-bars telescopically connected, the first or outer rack-bar consisting of a single bar, the remainder formed of two cheek-pieces connected by cross-ties, the bars connected and guided by dovetailed tongues and grooves; the last pair of cheek-pieces guided on ledges on the sides of the casing; automatic couplers for the rack-bars; a pin-and-groove engagement between the rack-bars; and a pinion which, when the system of rack-bars is shortened and confined within the casing, only engages the teeth of the forward rack-bar, and then in succession the remaining rack-bars; each bar throwing the next succeeding one into the path of the teeth of the pinion, substantially as and for the purpose specified.

4. In an ammunition conveyer or rammer for guns, the combination of a casing; a series of telescopically-connected rack-bars guided on ledges on the side of the casing; a pinion actuating said rack-bars in regular succession; automatic couplers for the rack-bars; and spring-bolts on the casing, engaging rests on the rack-bars to prevent one rack-bar from being carried along by frictional contact with the preceding rack-bar, and removed from the rests by the pull of the pinion transmitted from the rack-bar, engaged by the pinion, to the next succeeding one, substantially as and for the purpose specified.

5. In an ammunition conveyer or rammer for guns, the combination of a casing; a series of telescopically-connected rack-bars guided on ledges of the casing; a pinion actuating said rack-bars in regular succession; spring-bolts on the casing engaging rests on the rack-bars, to prevent outward motion of the rack-bars by frictional contact; the spring-bolts moved out of the rests by the pull of the pinion transmitted from the rack-bar, engaged by the pinion, to the next succeeding one; spring-pawls on the rack-bars and lugs engaged by said spring-pawls to prevent retrograde motion of the bars, and means to disengage the pawls, substantially as and for the purpose specified.

6. In an ammunition conveyer or rammer for guns, the combination of a casing A; a series of telescopic rack-bars; a pinion actuating said rack-bars in regular succession; spring-bolts D engaging rests on the rack-bars to prevent outward motion by frictional contact, said bolts D being disengaged from the rest by the pull of the pinion transmitted from the rack-bar, engaged by the pinion, to the next succeeding rack-bar; spring-pawls $f^2$ $f^3$ $f^4$ with projections $k^2$ $k^3$ $k^4$ mounted on the rack-bars; lugs $h'$ $h^2$ $h^3$ on the rack-bars engaged by said spring-pawls to couple succeeding bars together; and a comb-plate F with teeth $l^2$ $l^3$ $l^4$, said plate secured to the top of the casing above the pinion and engaging and holding the projections $k^2$ $k^3$ $k^4$ to keep the pawls away from the path of the lugs, when the bars are not coupled, releasing the projections and allowing the pawls to snap in and couple the bars as the rack-bar carrying the pawls is started forward, and moving the pawls away from the lugs by the inclined faces $m^2$ $m^3$ $m^4$ of the teeth $l^2$ $l^3$ $l^4$ as the rack-bar is about to complete its inward stroke, substantially as and for the purpose specified.

In testimony whereof I have hereunto set my hand in the presence of two subscribing witnesses.

GUSTAV A. SCHOELLER.

Witnesses:
GEO. P. PETTIT,
WILLIAM ESSENWEIN.